US010973219B2

(12) United States Patent
Crenshaw

(10) Patent No.: US 10,973,219 B2
(45) Date of Patent: Apr. 13, 2021

(54) DUAL NOZZLE SPRAYER

(71) Applicant: Kenneth D. Crenshaw, Bartlett, TN (US)

(72) Inventor: Kenneth D. Crenshaw, Bartlett, TN (US)

( * ) Notice: Subject to any disclaimer, the term of this patent is extended or adjusted under 35 U.S.C. 154(b) by 25 days.

(21) Appl. No.: 15/729,062

(22) Filed: Oct. 10, 2017

(65) Prior Publication Data

US 2018/0027798 A1 Feb. 1, 2018

Related U.S. Application Data

(63) Continuation of application No. 15/042,360, filed on Feb. 12, 2016, now Pat. No. 9,814,227.

(51) Int. Cl.
*A01M 7/00* (2006.01)
*B05B 9/01* (2006.01)
(Continued)

(52) U.S. Cl.
CPC ......... *A01M 7/0046* (2013.01); *B05B 1/1609* (2013.01); *B05B 1/1636* (2013.01);
(Continued)

(58) Field of Classification Search
CPC ..... A01M 7/0046; A01M 21/043; B05B 1/12; B05B 7/0408; B05B 7/02; B05B 1/14;
(Continued)

(56) References Cited

U.S. PATENT DOCUMENTS 1,331,465 A * 2/1920 Barrett .................. B05B 7/2435
239/345

2,726,898 A * 12/1955 Henriksson ........... B05B 1/1609
137/881

(Continued)

FOREIGN PATENT DOCUMENTS

| EP | 1930083 A2 | 6/2008 |
| WO | 2005018814 A2 | 3/2005 |
| WO | 2017139135 A1 | 8/2017 |

OTHER PUBLICATIONS

European Search Report on corresponding European Patent Application No. EP 17 75 0579, dated Aug. 23, 2019, 8 pages.
Canada Intellectual Property Office: Office Action for co-pending Canadian Patent Application No. 3,012,687 dated Oct. 11, 2019.

*Primary Examiner* — Tuongminh N Pham
(74) *Attorney, Agent, or Firm* — Patterson Intellectual Property Law, P.C.; Edward D. Lanquist, Jr.; Alex H. Huffstutter

(57) ABSTRACT

A fluid spray apparatus includes an inlet and first and second outlets. A first actuator may communicate the inlet with at least one of the outlets. A second actuator also may communicate the inlet with at least one of the outlets. A passage network of the fluid spray apparatus communicates the first and second actuators with the first and second outlets. A diverter structure is disposed in the passage network. The diverter structure includes a first diverter structure arrangement. In the first diverter structure arrangement, the first actuator communicates the inlet with the first outlet and the second actuator communicates the inlet with the second outlet. The diverter structure also includes a second diverter structure arrangement. In the second diverter structure arrangement, the first actuator communicates the inlet with the second outlet and the second actuator communicates the inlet with the first outlet.

17 Claims, 14 Drawing Sheets

(51) Int. Cl.
  *B05B 12/00* (2018.01)
  *B05B 1/16* (2006.01)
  *B05B 1/30* (2006.01)

(52) U.S. Cl.
  CPC .............. *B05B 1/3013* (2013.01); *B05B 9/01* (2013.01); *B05B 12/002* (2013.01)

(58) Field of Classification Search
  CPC ......... B05B 1/16; B05B 1/169; B05B 1/1609; B05B 1/1636; B05B 1/3013; B05B 9/01; B05B 12/002; H01H 13/08; H01H 13/70; H01H 21/22; H01H 2221/016
  USPC .................. 239/445, 525, 526; 200/518, 332
  See application file for complete search history.

(56) References Cited

U.S. PATENT DOCUMENTS

| | | | | |
|---|---|---|---|---|
| 3,511,951 | A | * 5/1970 | Miller | .................... H01H 13/08 200/50.32 |
| 5,979,800 | A | * 11/1999 | Takagi | .................. B05B 1/1681 239/440 |
| 9,814,227 | B2 | 11/2017 | Crenshaw | |
| 2002/0158143 | A1 | 10/2002 | Moriarty et al. | |
| 2004/0227014 | A1 | 11/2004 | Williams et al. | |
| 2006/0272628 | A1* | 12/2006 | Styles | ..................... F41A 19/58 124/73 |
| 2011/0121105 | A1* | 5/2011 | Moriarty | ................ A46B 11/06 239/526 |
| 2012/0043364 | A1* | 2/2012 | Coleman, Jr. | ........... B25C 1/043 227/8 |

\* cited by examiner

DUAL NOZZLE SPRAYER

BACKGROUND

The present disclosure relates generally to a fluid spray apparatus. More particularly, the present disclosure pertains to a fluid spray gun including multiple outlets.

Fluid spray guns are known in the art. In herbicide applications, spray guns with adjustable nozzles designed to be twisted back and forth by a user are available. A user may wish to apply herbicide to a nearby target with a fan-type pattern and to a distant target with a straight stream pattern that will break up into smaller droplets near the target. To adjust the nozzle to either setting, the user must remove his or her hand from the backpack pumping lever to twist the adjustable nozzle. This method also requires the user to make contact with parts covered in the herbicide. Furthermore, the method can become tiresome to a user, prompting the user to leave the nozzle on the straight stream pattern. If left on the straight stream pattern, the spray will overpenetrate the nearby targets and cause poor performance, environmental problems, and wasted herbicide.

BRIEF SUMMARY

Some embodiments of the current disclosure may allow for spraying different patterns using only one hand, transitioning from one pattern to another quickly and easily, and optionally reversing the actuator-output relationship.

Briefly, the present disclosure relates, in one embodiment, to a fluid spray apparatus. The fluid spray apparatus includes an inlet and first and second outlets. The fluid spray apparatus further includes a first actuator. The first actuator is configured to communicate the inlet with at least one of the outlets. The fluid spray apparatus also includes a second actuator. The second actuator is also configured to communicate the inlet with at least one of the outlets. A passage network of the fluid spray apparatus communicates the first and second actuators with the first and second outlets. A diverter structure is disposed in the passage network. The diverter structure includes a first diverter structure arrangement. In the first diverter structure arrangement, the first actuator communicates the inlet with the first outlet and the second actuator communicates the inlet with the second outlet. The diverter structure also includes a second diverter structure arrangement. In the second diverter structure arrangement, the first actuator communicates the inlet with the second outlet and the second actuator communicates the inlet with the first outlet.

In an alternative embodiment, the diverter structure includes a plurality of plugs removably disposed in one of a plurality of positions blocking a portion of the passage network.

In still another embodiment, the diverter structure includes a selector valve.

In yet another embodiment, the first diverter structure arrangement and the second diverter structure arrangement are mutually exclusive.

In another embodiment, the first outlet and the second outlet are each configured to receive a variety of fluid spray nozzles.

In a further embodiment, the first outlet includes a diffuse spray nozzle and the second outlet includes a solid stream nozzle.

In a further still embodiment, at least one of the first outlet and the second outlet includes an adjustable spray nozzle.

Yet another embodiment includes a handle, and the first and second actuators are hingedly and opposingly disposed on the handle.

In still another embodiment, each of the first and second actuators includes a hinge end and a free end opposite the hinge end. The actuators are positioned such that the free ends are nearer each other than the hinge ends.

In an even further embodiment, the handle includes a pistol grip handle.

The present disclosure also relates, in one embodiment, to a fluid spray apparatus including an inlet, a first outlet, and a second outlet. A first actuator is configured to communicate the inlet with at least one of the outlets. A second actuator is configured to communicate the inlet with at least one of the outlets. The fluid spray apparatus also includes a selector valve. The selector valve includes a first position wherein the first actuator communicates the inlet with the first outlet and the second actuator communicates the inlet with the second outlet. The selector valve also includes a second position wherein the first actuator communicates the inlet with the second outlet and the second actuator communicates the inlet with the first outlet.

In another embodiment, the first outlet and the second outlet are each configured to receive one of a variety of fluid spray nozzles.

In one embodiment, the first actuator includes a first trigger and the second actuator includes a second trigger.

In a further embodiment, the first and second triggers are configured to be aligned with each other and opposed to each other.

In a further still embodiment, the handle includes a pistol grip handle.

In an even further embodiment, each of the first and second actuators is further configured to prevent communication between the inlet and at least one of the outlets when the actuators are unactuated.

In another embodiment, the selector valve is configured to be rotated to the first position and to the second position by a user.

The present disclosure also relates, in an embodiment, to a method of operating a fluid spray apparatus having a fluid inlet and first and second fluid outlets. The method includes placing a diverter structure in a first arrangement. With the diverter structure in the first arrangement, a first trigger is actuated to flow fluid from the inlet to the first outlet. Also with the diverter structure in the first arrangement, a second trigger is actuated to flow fluid from the inlet to the second outlet. The method further includes placing the diverter structure in a second arrangement. With the diverter structure in the second arrangement, the first trigger is actuated to flow fluid from the inlet to the second outlet. Also with the diverter structure in the second arrangement, the second trigger is actuated to flow fluid from the inlet to the first outlet.

In a further embodiment, placing the diverter structure in the first arrangement includes removably placing a plurality of plugs in the first arrangement to block a portion of a passage network of the fluid spray apparatus. Placing the diverter structure in the second arrangement includes removably placing the plurality of plugs in the second arrangement to block a different portion of the passage network.

In another embodiment, placing the diverter structure in the first arrangement includes placing a selector valve in a first position. Placing the diverter structure in the second arrangement includes placing the selector valve in a second position.

DETAILED DESCRIPTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected" and "attached" should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

Figure 2:
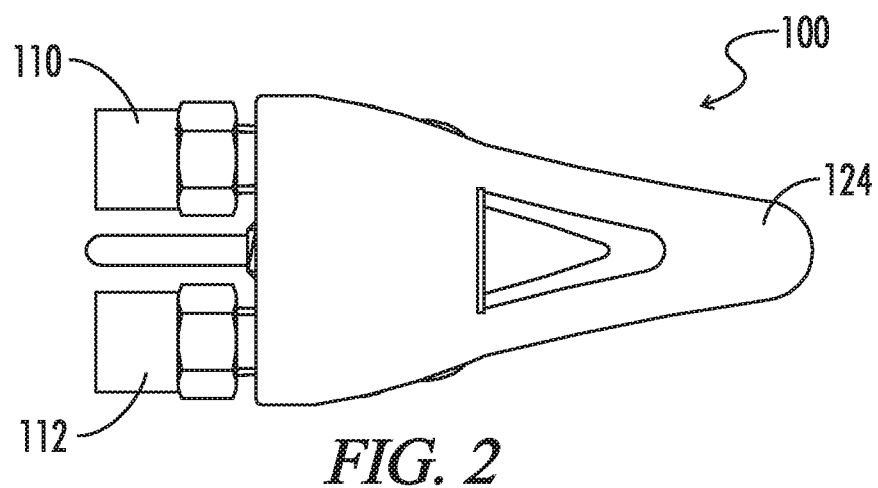
FIG. 2 is a top view of the fluid spray apparatus of FIG. 1.
Figure 1:
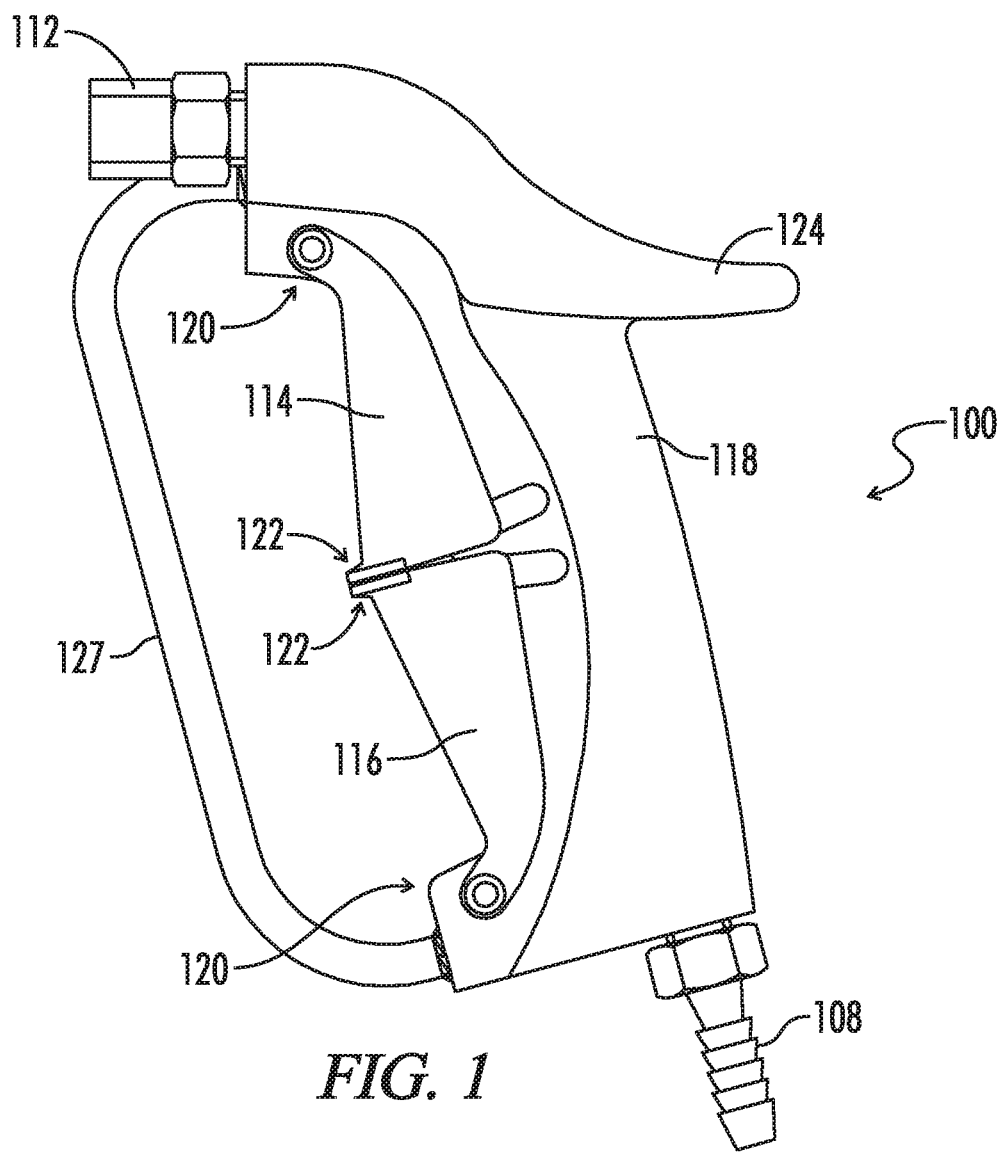
FIG. 1 is a side view of one embodiment of the fluid spray apparatus.
Figure 3:
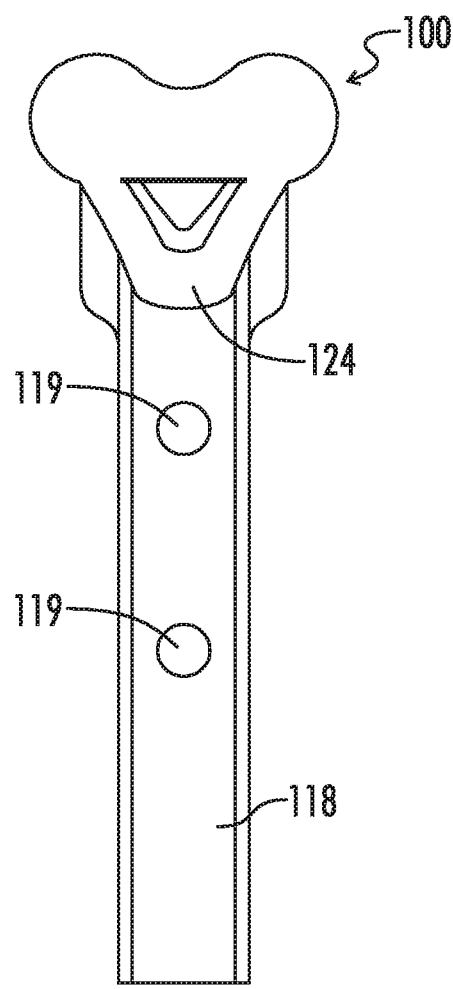
FIG. 3 is a rear view of the fluid spray apparatus of FIG. 1.
Figure 4:
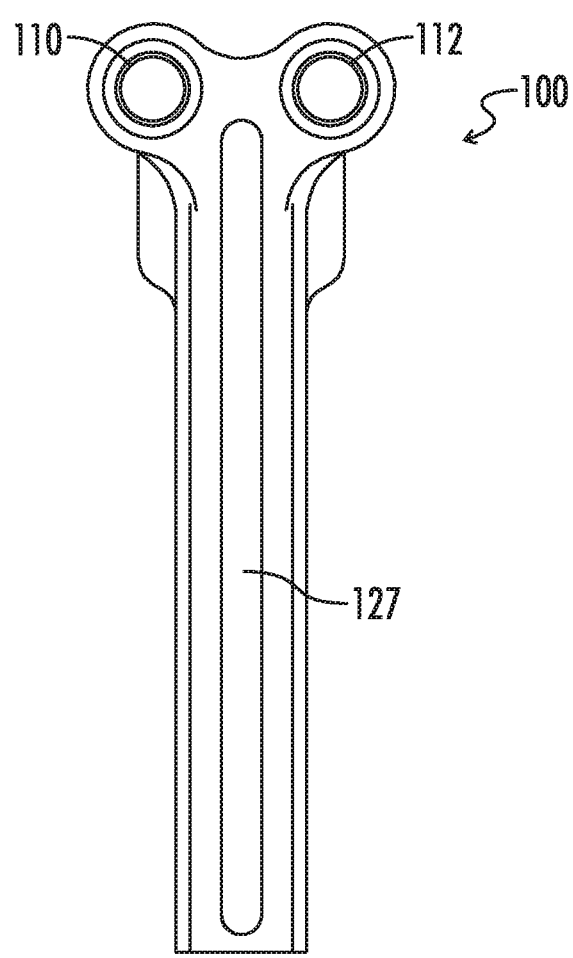
FIG. 4 is a front view of the fluid spray apparatus of FIG. 1 with the actuators removed.
Figure 5:
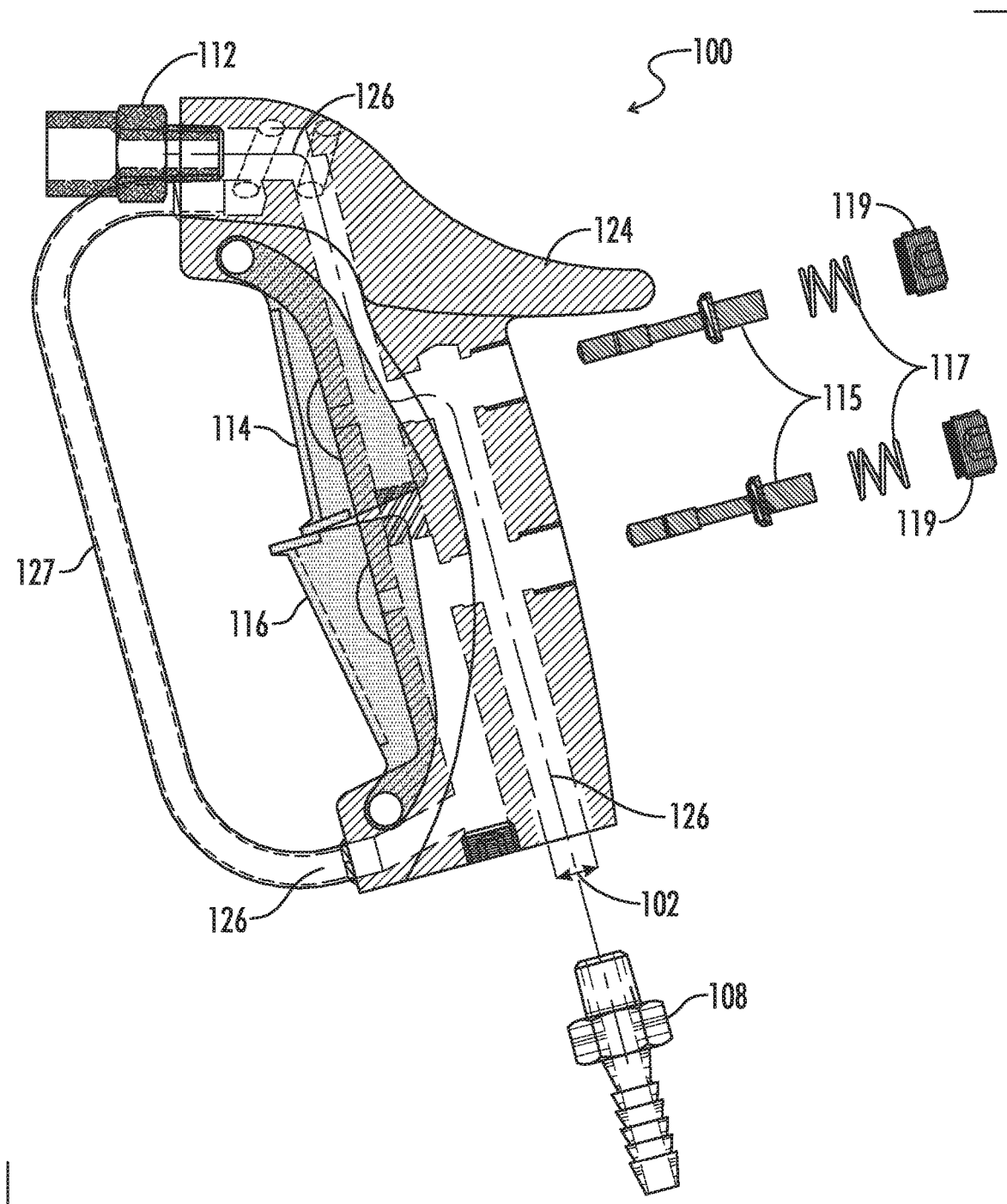
FIG. 5 is a side cross-sectional partially exploded view of the fluid spray apparatus of FIG. 1.
Figure 6:
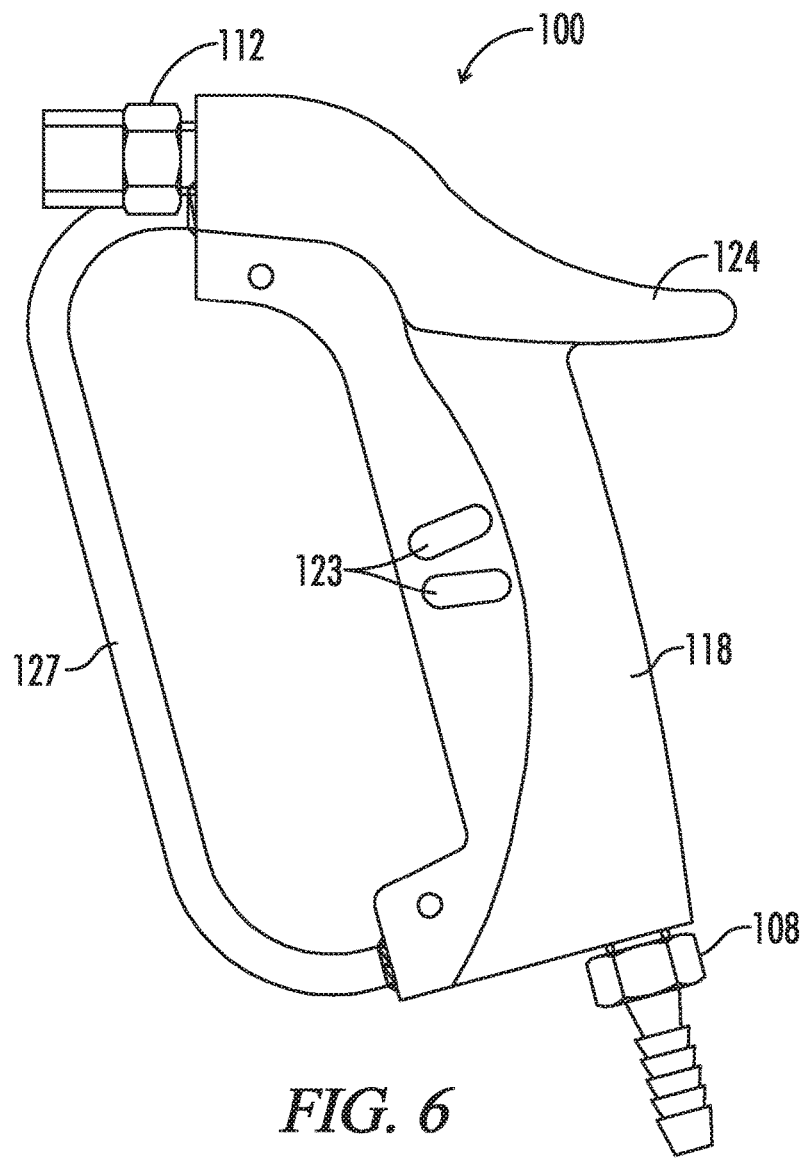
FIG. 6 is a side view of the fluid spray apparatus of FIG. 1 with the actuators removed.
Figure 7:
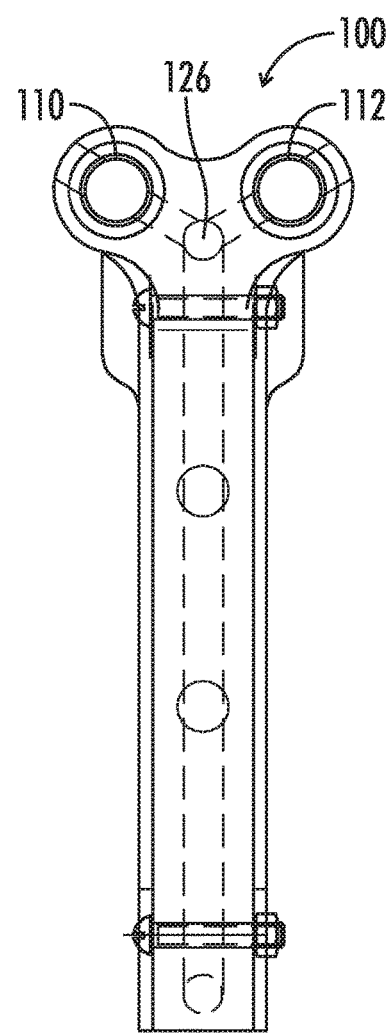
FIG. 7 is a front cross-sectional view of the fluid spray apparatus of FIG. 1.
Figure 8:
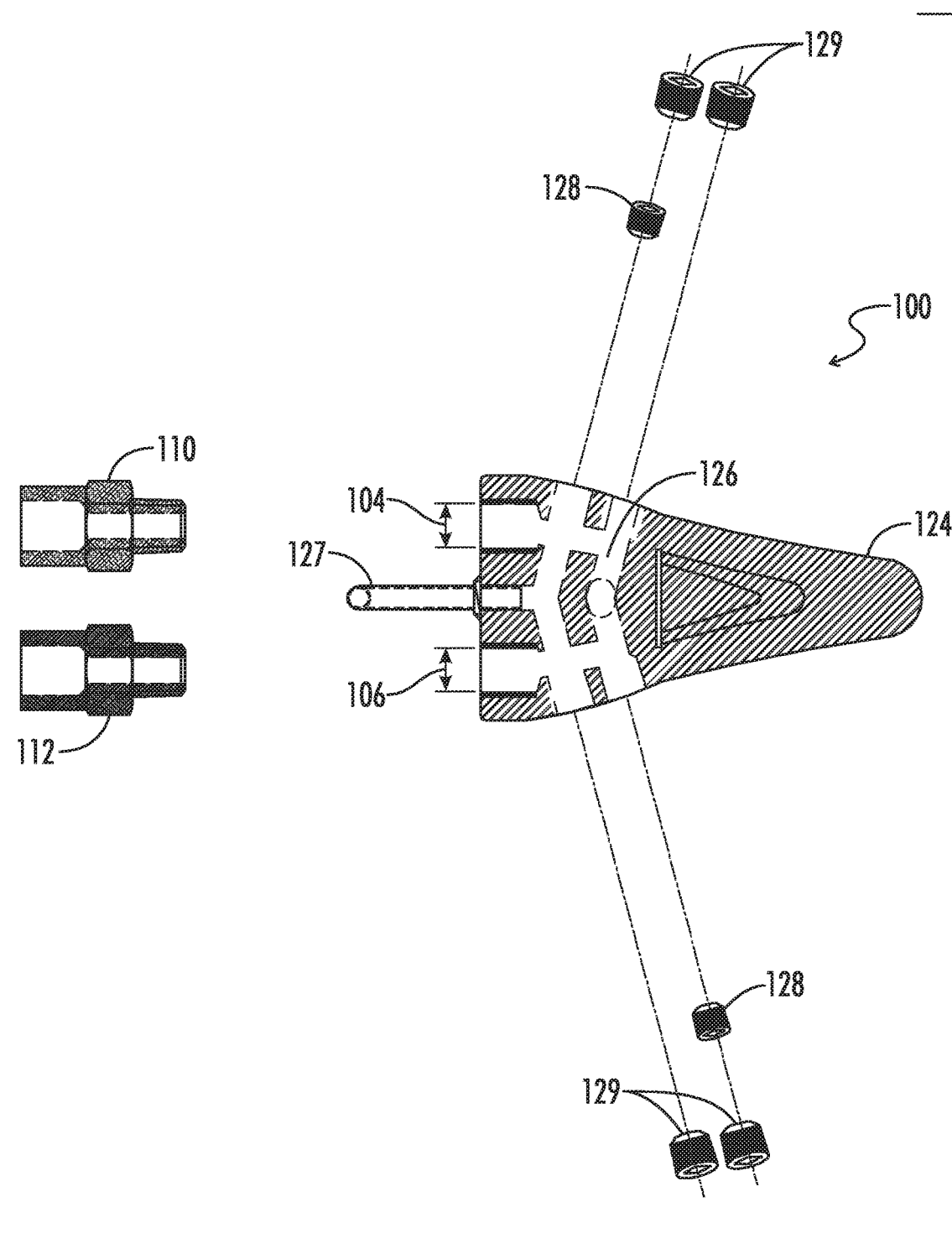
FIG. 8 is a top cross-sectional partially exploded view of the fluid spray apparatus of FIG. 1.

Referring to the Figures, one embodiment of a fluid spray apparatus, or spray gun, 100 is shown. As can best be seen in FIG. 5, the spray gun 100 includes an inlet 102, a first outlet 104, and a second outlet 106. The spray gun 100 optionally includes a hose attachment barb 108 on the inlet 102. The inlet 102 could alternatively include a quick-release connector, a threaded male or female coupler, and the like. The spray gun 100 may also include a first nozzle 110 disposed on the first outlet 104 and a second nozzle 112 disposed on the second outlet 106. Both first nozzle 110 and second nozzle 112 may be permanently connected or removably connected to the spray gun 100. The first and second nozzles 110, 112 may include commonly available standard spray tips that are threadedly received in the first and second outlets 104, 106 respectively. In other embodiments, the nozzles 110, 112 are retained in the outlets 104, 106 with quick-release, snap-on, latching, or other releasable attachment configurations. First nozzle 110 and second nozzle 112 may be of varying spray patterns such that the spray gun 100 may operate with any of a plurality of spray patterns. One embodiment of the spray gun 100 includes the first outlet 104 including a diffuse spray nozzle and the second outlet 106 including a solid stream nozzle. Another embodiment of the spray gun 100 includes at least one of the first outlet 104 and second outlet 106 including an adjustable spray nozzle.

In an embodiment, a first actuator 114 is configured to communicate the inlet 102 with at least one of the outlets 104, 106 such that communication is prevented when the first actuator is unactuated. A second actuator 116 is also configured to communicate the inlet 102 with at least one of the outlets 104, 106 such that communication is prevented when the second actuator is unactuated. Each actuator 114, 116 may actuate valves 115 that are normally biased toward the closed position by springs 117. Each valve 115 may be accessible for replacement or repair by removing a spring retainer plug 119 with common tools, including, but not limited to, a hex key. The actuators 114, 116 may be hingedly connected to the handle 118 such that the actuators include triggers. In some embodiments, the handle 118 may be a pistol grip handle. The actuators 114, 116 may be aligned with each other and opposingly disposed on the handle 118. The actuators 114, 116 may be configured such that the first actuator 114 may be actuated with the index finger and middle finger of a user and the second actuator 116 may be actuated with the ring finger and little finger of the user. Each actuator 114, 116 may include a hinge end 120 and a free end 122. The free ends 122 of the actuators 114, 116 may be nearer each other than the hinge ends 120.

The handle 118 of the spray apparatus may, in some embodiments, include guide channels 123 configured to receive a portion of a respective trigger/actuator 114, 116. The guide channels 123, in conjunction with the curved free ends 122 of the triggers 114, 116, may prevent pinching a user's fingers when one or more of the triggers are actuated. In at least one embodiment, the trigger free ends 122 remain in contact with each other during actuation. The channels 123 also may function to prevent over-actuation of the actuators 114, 116. The channels 123 may further function to hold the actuators in close readiness to the valve assembly.

In some embodiments, the handle 118 is angled from the spray direction of the nozzles 110, 112 such that the handle and the spray direction of the nozzles forms an angle of between 90 and 180 degrees. More specifically, the handle 118 and the spray direction of the nozzles 110, 112 form an angle of between 90 and 120 degrees. Even more specifically, the handle 118 and the spray direction of the nozzles 110, 112 form an angle of 105 degrees. These angles may be desirable to allow for ergonomic and comfortable use for a user's wrist when holding the spray apparatus 100. Furthermore, the spray apparatus 100 may include a flat or contoured protrusion 124 extending from the handle. The protrusion 124 may be configured such that a user's hand between the thumb and index finger may rest against the protrusion to aid in supporting the weight of the spray apparatus 100. Another ergonomic feature optionally included in the spray apparatus 100 is the location of the inlet 102 at the bottom of the handle 118. This location allows for any hose attached to the hose attachment barb 108 to extend below the wrist of a user so the hose does not get in the way of the user's arm and so the weight of the hose and the spray gun 100 may be close to the user's hand.

Some embodiments of the fluid spray apparatus 100 may include a passage network 126 including multiple paths connecting the inlet 102 with the first outlet 104 and second outlet 106. The paths may be, but are not limited to, one or more paths defined in the handle 118 of the spray apparatus 100, one or more tubes 127 exterior to the handle of the spray apparatus, and the like.

In one embodiment of the fluid spray apparatus 100, a diverter structure including a plurality of plugs 128 may be removably disposed in one of a plurality of positions blocking a portion of the passage network 126. Threaded covers 129 may be removed with common tools including, but not limited to, a hex key to access the plugs 128 or to clean the passage network 126. The plurality of positions may form a first diverter structure arrangement and a second diverter structure arrangement. In some embodiments, the first diverter structure arrangement and the second diverter structure arrangement may be mutually exclusive.

Figure 9:
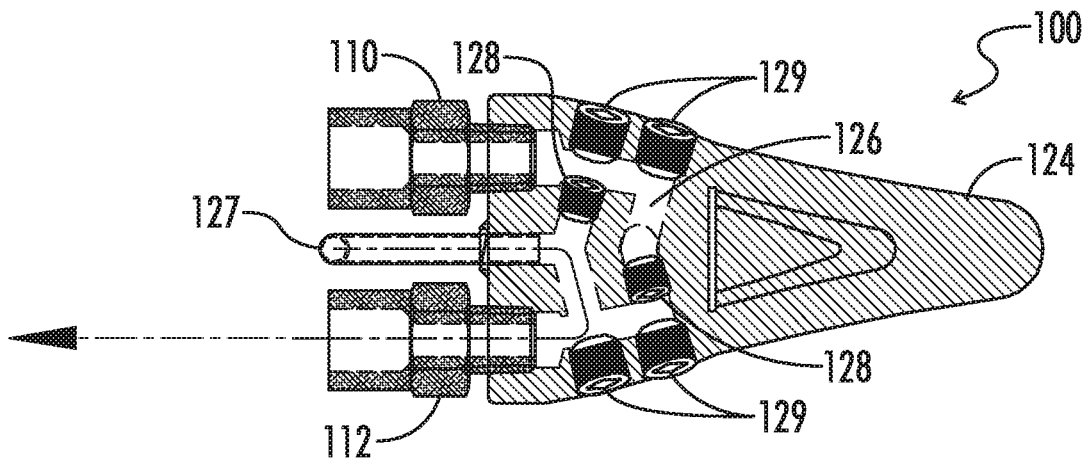
FIG. 9 is a top cross-sectional view of the fluid spray apparatus of FIG. 1 with the diverter structure in a first arrangement and the bottom actuator actuated.
Figure 12:
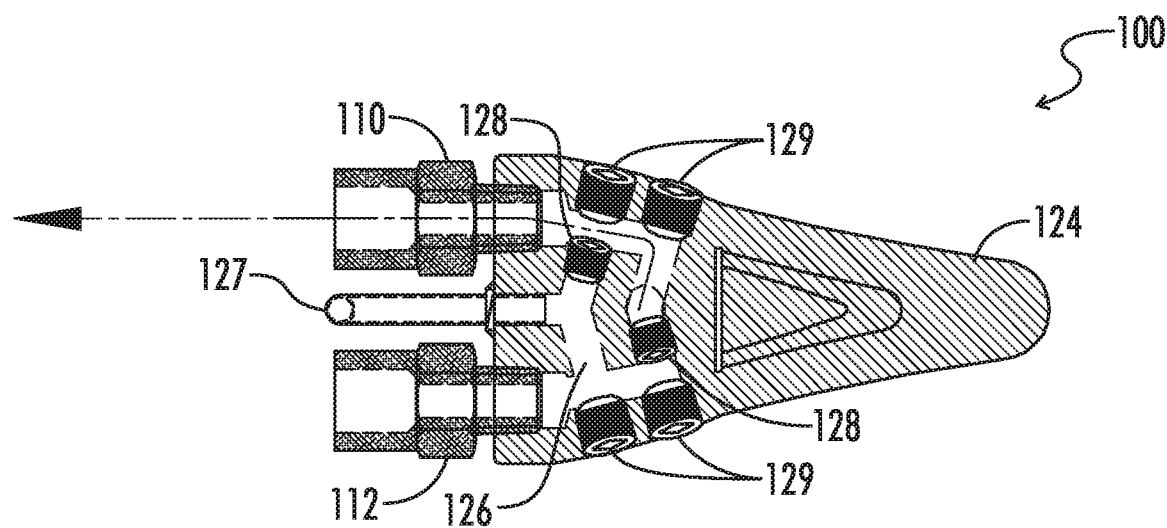
FIG. 12 is a top cross-sectional view of the fluid spray apparatus of FIG. 1 with the diverter structure in a first arrangement and the top actuator actuated.

As shown in FIGS. 9 and 12, the plurality of plugs 128 may be placed in a first diverter structure arrangement wherein the first actuator 114 may communicate the inlet 102 with the first outlet 104 and the second actuator 116 may communicate the inlet with the second outlet 106. In embodiments including the hose attachment barb 108 and the first and second nozzles 110, 112, the first actuator 114 may communicate the opening of the hose attachment barb with the opening of the first nozzle and the second actuator 116 may communicate the opening of the hose attachment barb with the opening of the second nozzle.

Figure 10:
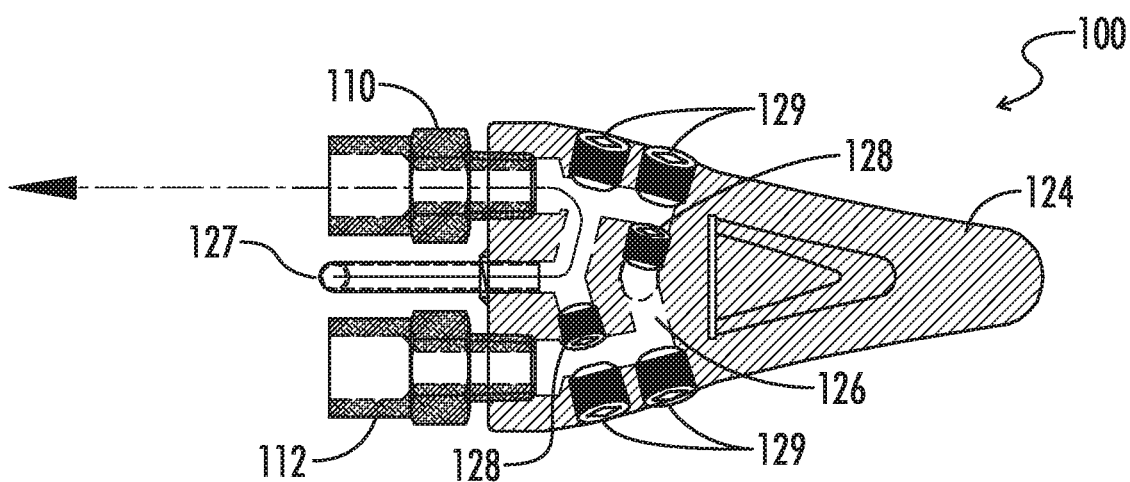
FIG. 10 is a top cross-sectional view of the fluid spray apparatus of FIG. 1 with the diverter structure in a second arrangement and the bottom actuator actuated.
Figure 11:
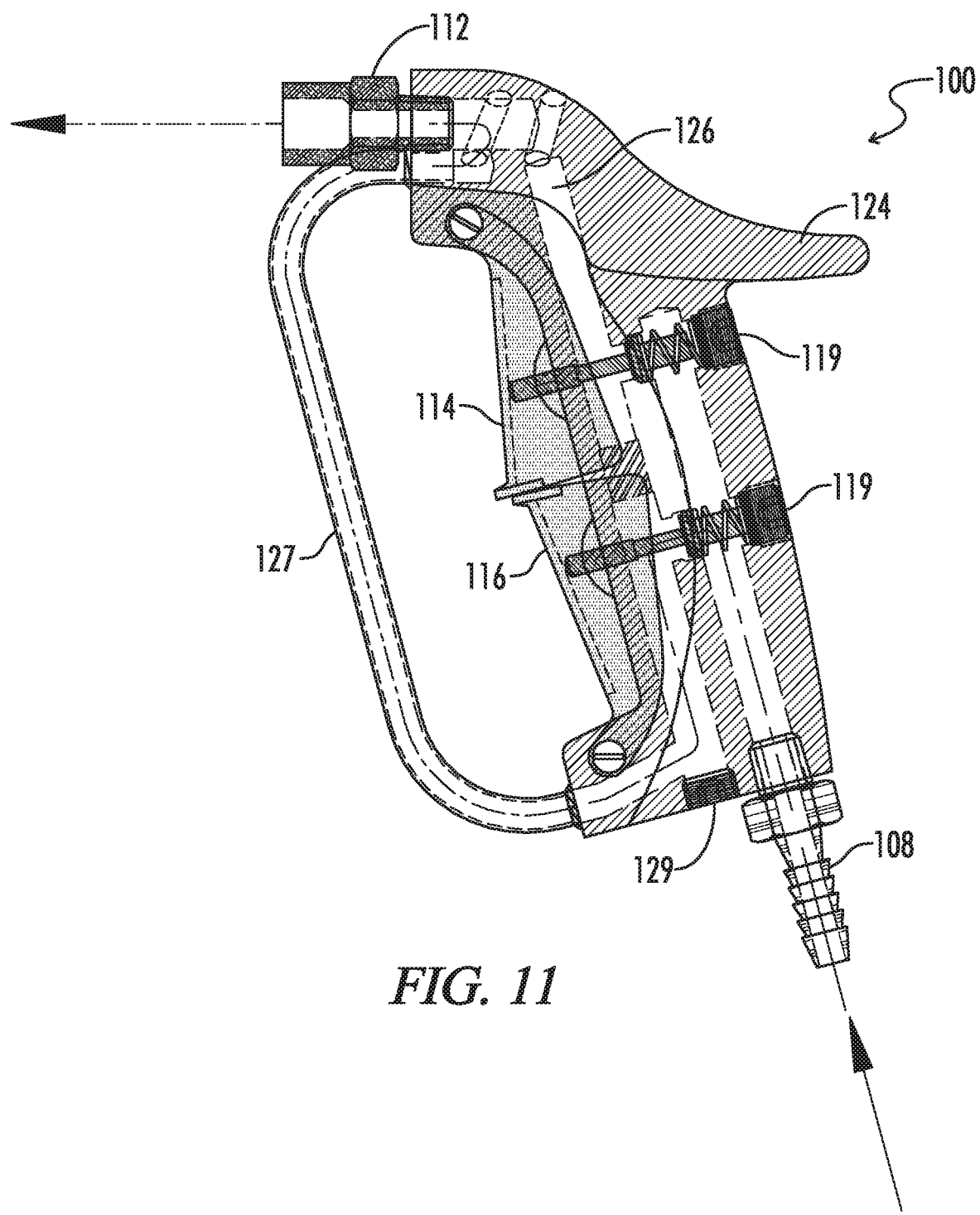
FIG. 11 is a side cross-sectional view of the fluid spray apparatus of FIG. 1 with the bottom actuator actuated.
Figure 13:
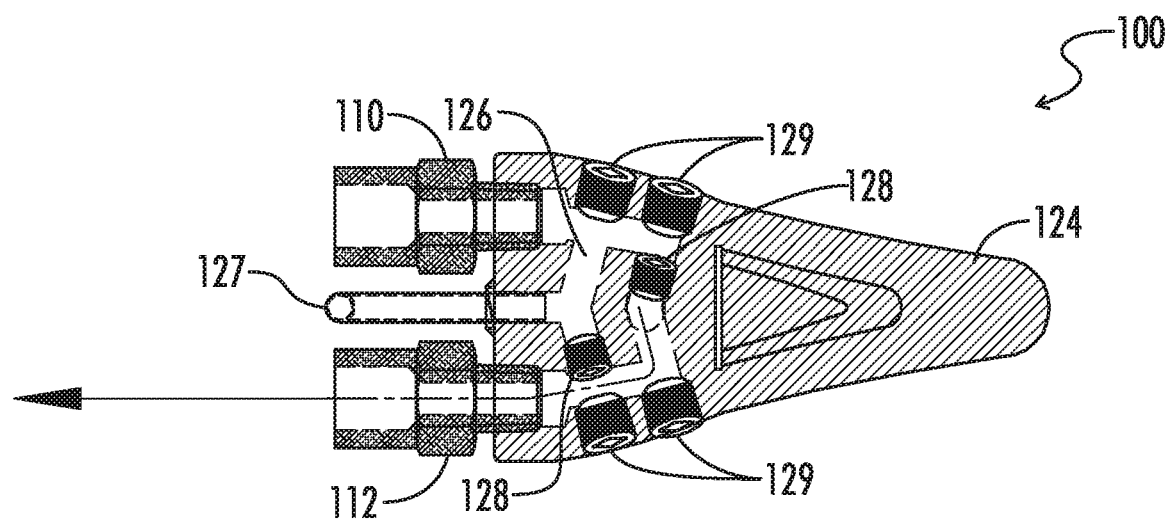
FIG. 13 is a top cross-sectional view of the fluid spray apparatus of FIG. 1 with the diverter structure in a second arrangement and the top actuator actuated.
Figure 14:
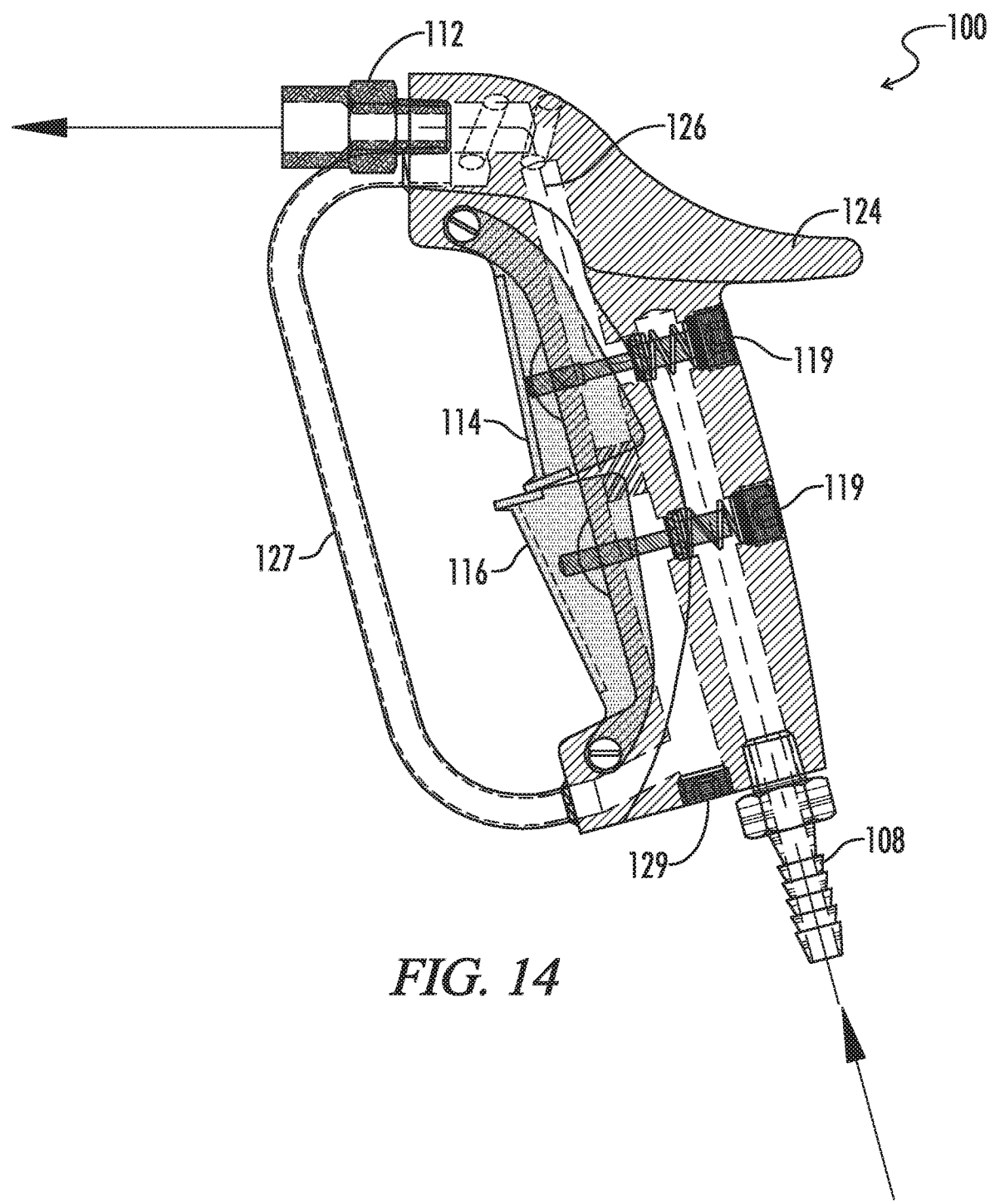
FIG. 14 is a side cross-sectional view of the fluid spray apparatus of FIG. 1 with the top actuator actuated.
Figure 15:
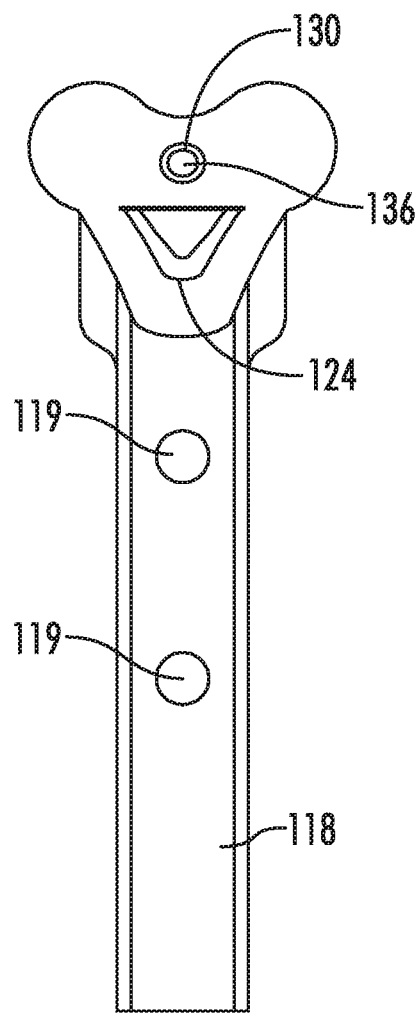
FIG. 15 is a rear view of one embodiment of the fluid spray apparatus.
Figure 16:
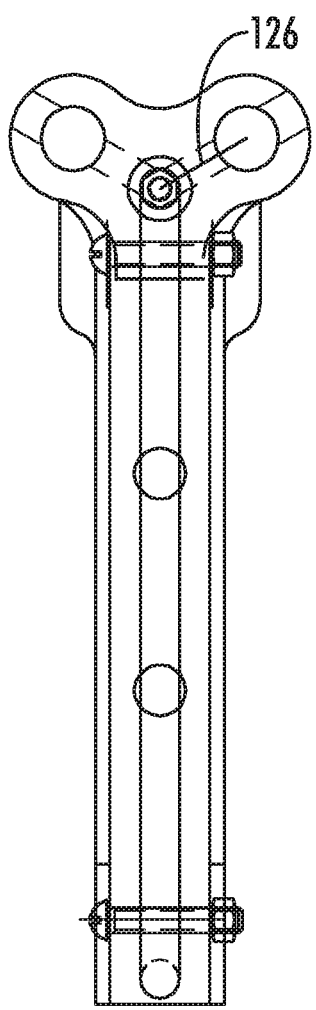
FIG. 16 is a front cross-sectional view of the fluid spray apparatus of FIG. 15.

As shown in FIGS. 10 and 13, the plurality of plugs 128 may be placed in a second diverter structure arrangement wherein the first actuator 114 may communicate the inlet 102 with the second outlet 106 and the second actuator 116 may communicate the inlet with the first outlet 104. In some embodiments, the first actuator 114 may communicate the opening of the hose attachment barb 108 with the opening of the second nozzle 112 and the second actuator 116 may communicate the opening of the hose attachment barb with the opening of the first nozzle 110.

Figure 17:
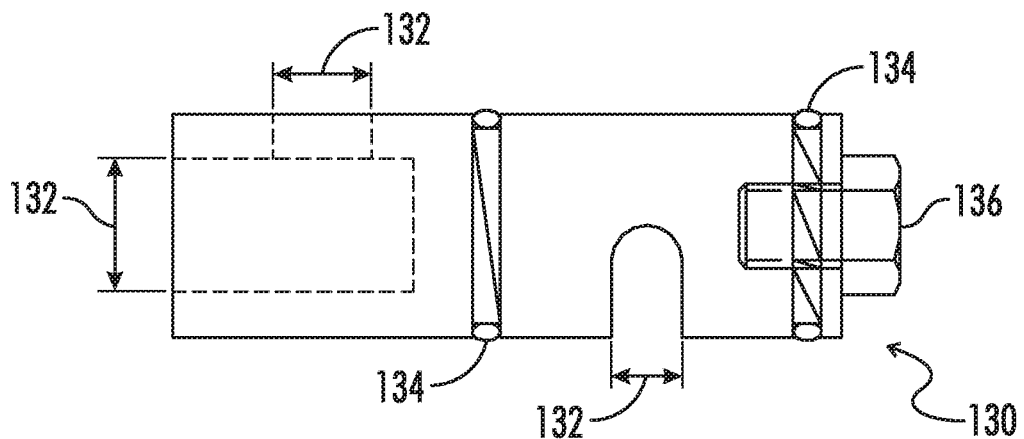
FIG. 17 is a side view of a selector valve of the fluid spray apparatus of FIG. 15.

In some embodiments of the fluid spray apparatus 100, the diverter structure may include a selector valve 130. As can best be seen in FIG. 17, the selector valve 130 may include a plurality of pathways 132 to direct fluid flow. The selector valve 130 may also include one or more sealing portions, or O-rings, 134 to aid in directing fluid flow. In some embodiments, the selector valve 130 may also include a user control portion 136. The user control portion 136 may include, but is not limited to, a hex head, a lever, a button, and the like. In some embodiments of the fluid spray apparatus 100, the selector valve 130 may be configured to be rotated to a first position, or first diverter structure arrangement, and to a second position, or second diverter structure arrangement, by a user.

Figure 18:
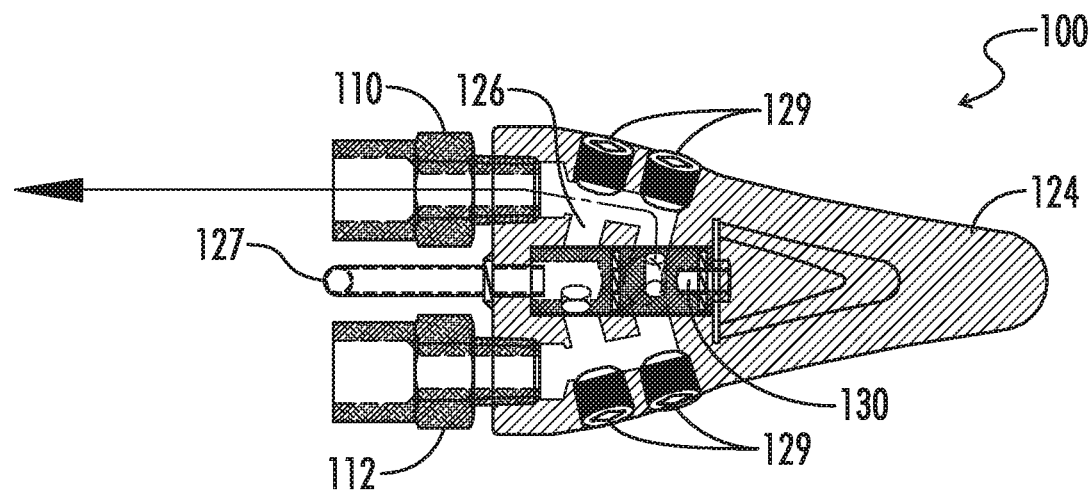
FIG. 18 is a top cross-sectional view of the fluid spray apparatus of FIG. 15 with the diverter structure in a first arrangement and the top actuator actuated.
Figure 21:
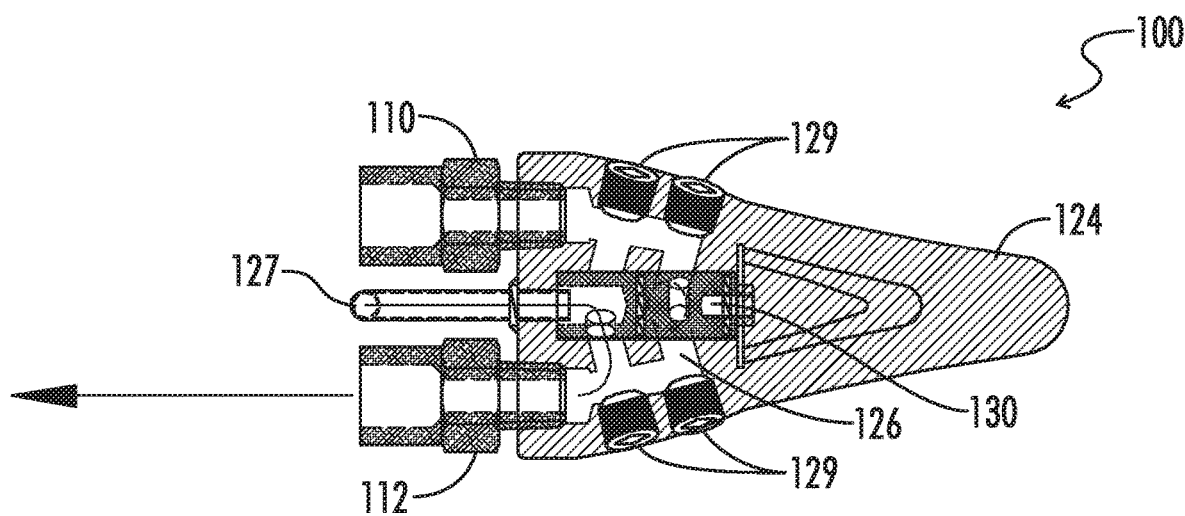
FIG. 21 is a top cross-sectional view of the fluid spray apparatus of FIG. 15 with the diverter structure in a first arrangement and the bottom actuator actuated.

As shown in FIGS. 18 and 21, the selector valve 130 may be placed in a first position, or first diverter structure arrangement, wherein the first actuator 114 may communicate the inlet 102 with the first outlet 104 and the second actuator 116 may communicate the inlet with the second outlet 106. In some embodiments, the selector valve 130 may be placed in the first position and the first actuator 114 may communicate the opening of the hose attachment barb 108 with the opening of the first nozzle 110 and the second actuator 116 may communicate the opening of the hose attachment barb with the opening of the second nozzle 112.

Figure 19:
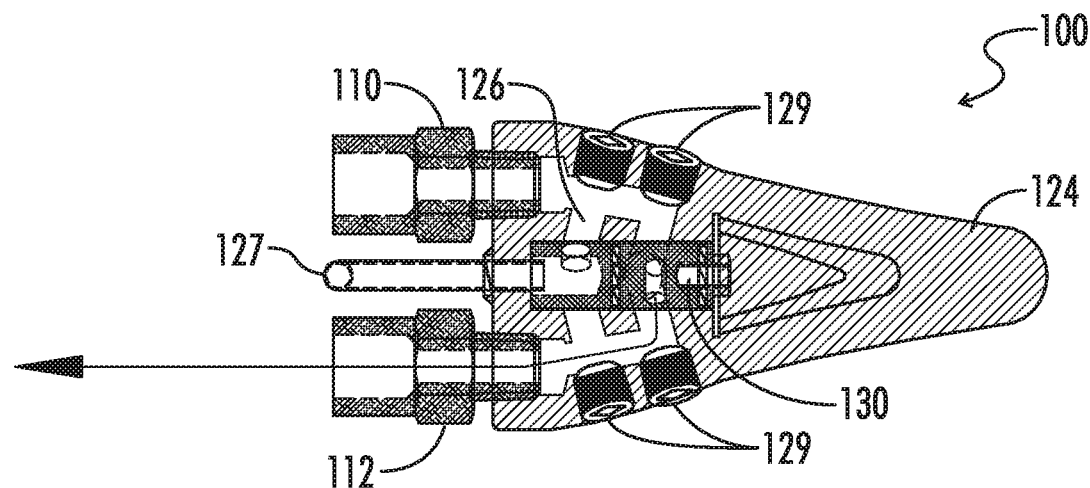
FIG. 19 is a top cross-sectional view of the fluid spray apparatus of FIG. 15 with the diverter structure in a second arrangement and the top actuator actuated.
Figure 20:
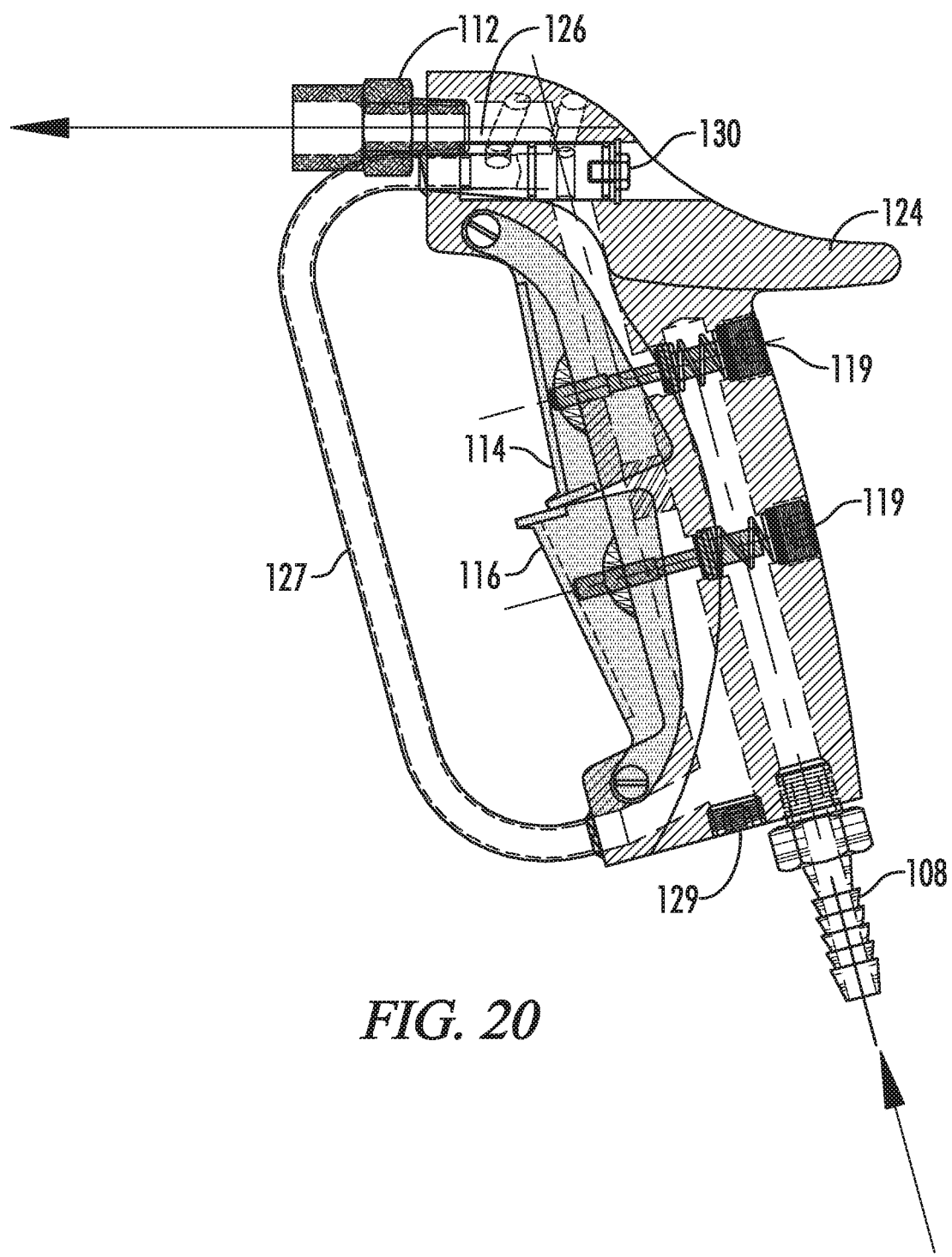
FIG. 20 is a side cross-sectional view of the fluid spray apparatus of FIG. 15 with the top actuator actuated.
Figure 22:
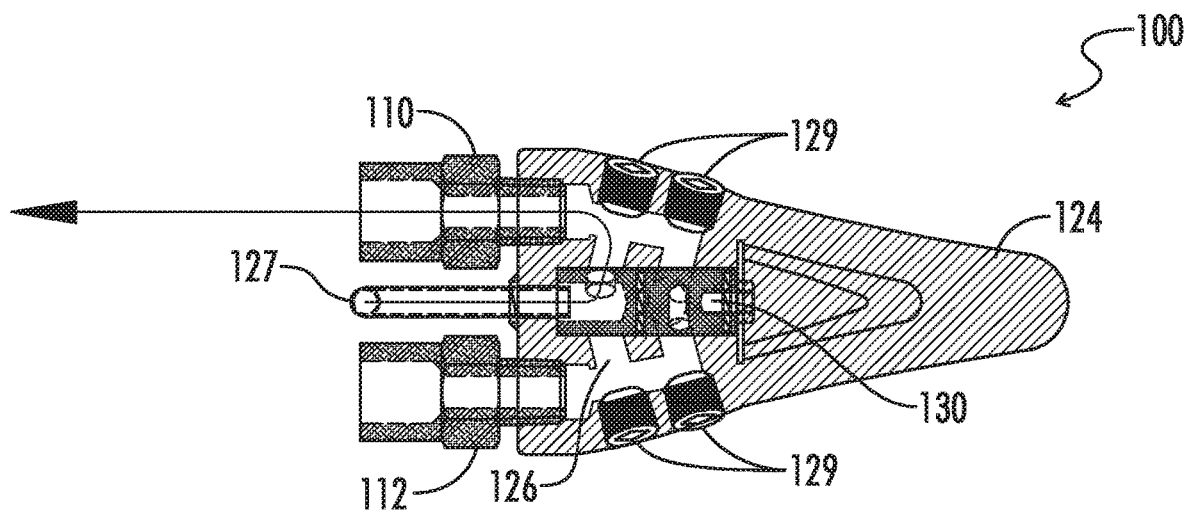
FIG. 22 is a top cross-sectional view of the fluid spray apparatus of FIG. 15 with the diverter structure in a second arrangement and the bottom actuator actuated.
Figure 23:
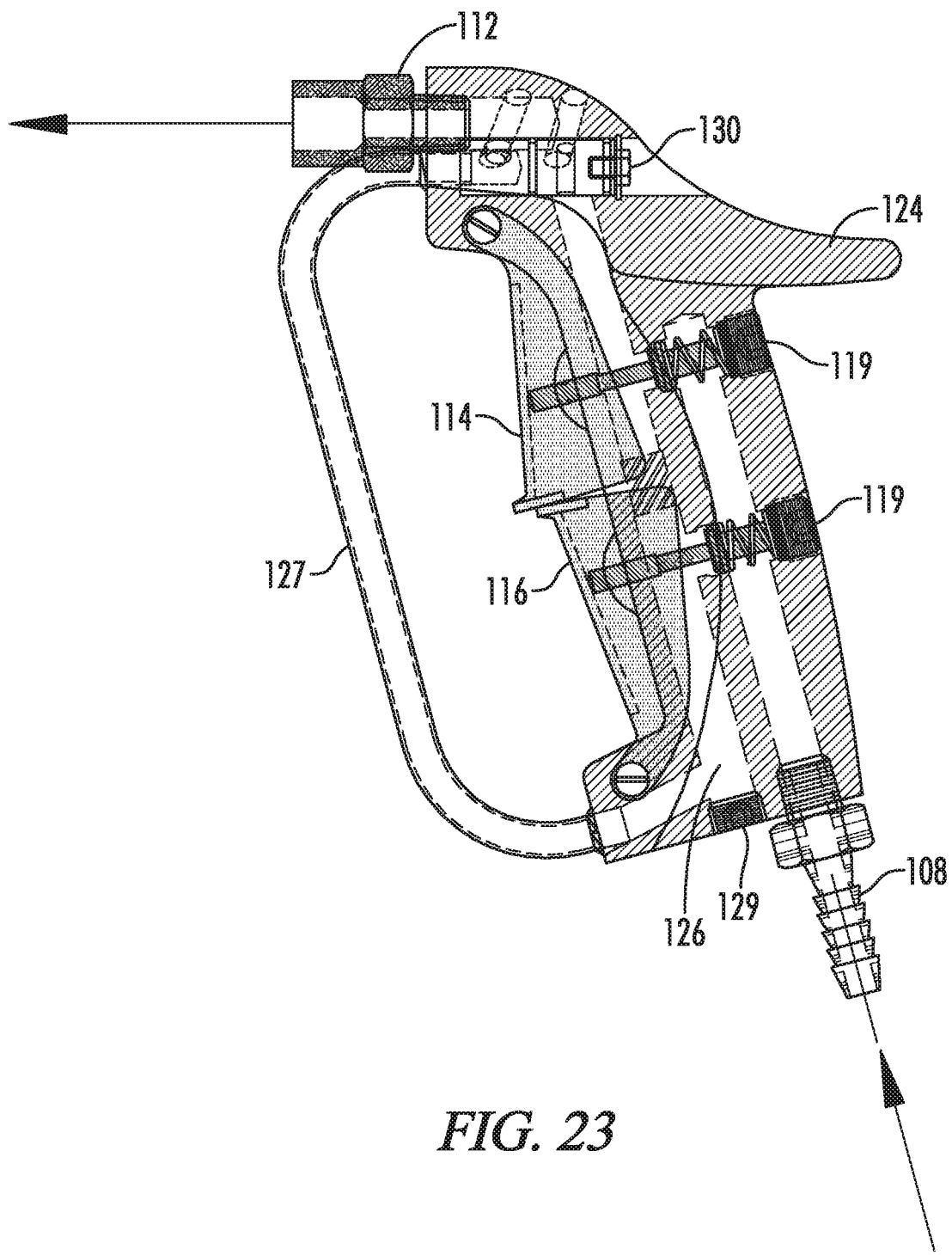
FIG. 23 is a side cross-sectional view of the fluid spray apparatus of FIG. 15 with the bottom actuator actuated.

As shown in FIGS. 19 and 22, the selector valve 130 may be placed in a second position, or second diverter structure arrangement, wherein the first actuator 114 may communicate the inlet 102 with the second outlet 106 and the second actuator 116 may communicate the inlet with the first outlet 104. In some embodiments, the selector valve 130 may be placed in the second position and the first actuator 114 may communicate the opening of the hose attachment barb 108 with the opening of the second nozzle 112 and the second actuator 116 may communicate the opening of the hose attachment barb with the opening of the first nozzle 110.

The current disclosure also relates to a method of operating the fluid spray apparatus 100 including the fluid inlet 102 and first and second fluid outlets 104, 106. The method may include placing a diverter structure, including, but not limited to, the plurality of plugs 128 or the selector valve 130, in a first arrangement. With the diverter structure in the first arrangement, the user may actuate the first actuator, or first trigger, 114 to flow fluid from the inlet 102 to the first outlet 104. With the diverter structure in the first arrangement, the user may also actuate the second actuator, or second trigger, 116 to flow fluid from the inlet 102 to the second outlet 106. The user may place the diverter structure in a second arrangement. With the diverter structure in the second arrangement, the user may actuate the first actuator 114 to flow fluid from the inlet 102 to the second outlet 106. With the diverter structure in the second arrangement, the user may also actuate the second actuator 116 to flow fluid from the inlet 102 to the first outlet 104.

In one embodiment, the method of operating the fluid spray apparatus 100 may include removably placing the plurality of plugs 128 in the first arrangement to block a portion of the passage network 126 and placing the plurality of plugs in the second arrangement to block a different portion of the passage network.

In another embodiment, the method of operating the fluid spray apparatus 100 may include placing the selector valve 130 in a first position such that the diverter structure is in the first arrangement and a second position such that the diverter structure is in the second arrangement.

While the present disclosure has been described with particularity in relation to spraying herbicide, the present disclosure may also apply to any fluid spray apparatus used for any purpose including, but not limited to, distributing paint, detergents, pesticides, disinfectants, and the like.

This written description uses examples to disclose the invention and also to enable any person skilled in the art to practice the invention, including making and using any devices or systems. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Although embodiments of the disclosure have been described using specific terms, such description is for illustrative purposes only. The words used are words of description rather than limitation. It is to be understood that changes and variations may be made by those of ordinary skill in the art without departing from the spirit or the scope of the present disclosure, which is set forth in the following claims. In addition, it should be understood that aspects of the various embodiments may be interchanged in whole or in part. While specific uses for the subject matter of the disclosure have been exemplified, other uses are contemplated. Therefore, the spirit and scope of the appended claims should not be limited to the description of the versions contained herein.

What is claimed is:

1. A fluid spray comprising:
    an inlet;
    a first outlet;
    a second outlet;
    a handle having a proximal end and a distal end relative to the first and second outlets, the handle further including a first side;
    a first actuator configured to communicate the inlet with the first outlet, the first actuator including a first actuator hinge end and a first actuator free end, the first actuator hinge end pivotally connected to the first side of the handle at the proximal end, the first actuator free end extending toward the distal end; and
    a second actuator configured to communicate the inlet with the second outlet, the second actuator including a second actuator hinge end and a second actuator free end, the second actuator hinge end pivotally connected to the first side of the handle at the distal end, the second actuator free end extending toward the proximal end and configured to contact the first actuator free end, wherein
    the first side of the handle is configured to internally engage the first actuator nearer to the first actuator free end than to the first actuator hinge end, the first side of the handle is further configured to internally engage the second actuator nearer to the second actuator free end than to the second actuator hinge end.

2. The fluid spray apparatus of claim 1, wherein the first outlet and the second outlet are each configured to receive a variety of fluid spray nozzles.

3. The fluid spray apparatus of claim 1, wherein the first outlet includes a diffuse spray nozzle and the second outlet includes a solid stream nozzle.

4. The fluid spray apparatus of claim 1, wherein at least one of the first outlet and the second outlet includes an adjustable spray nozzle.

5. The fluid spray apparatus of claim 1, wherein the handle includes a pistol grip handle.

6. The fluid spray apparatus of claim 1, further comprising:
    guide channels including:
        a first guide channel configured to receive a portion of the first actuator through actuation; and
        a second guide channel configured to receive a portion of the second actuator through actuation.

7. The fluid spray apparatus of claim 1, wherein the first and second actuator free ends include curved free ends to prevent pinching a user's finger when one or both of the first actuator and the second actuator are actuated.

8. The fluid spray apparatus of claim 1, wherein each of the first actuator and the second actuator is biased toward an unactuated position.

9. A fluid spray apparatus comprising:
    an inlet;
    a first outlet;
    a second outlet;
    a handle; and
    a trigger block disposed on a front side of the handle, the trigger block comprising a first end, a second end, a first pivoting axis, a second pivoting axis, a first trigger member, and a second trigger member, the first end positioned at an upper end of the handle closer to the first and second outlets than to the second end, the second end positioned distal to the first and second outlets at a lower end of the handle, the first pivoting axis positioned at the first end, the second pivoting axis positioned at the second end, the first trigger member pivotally connected to the first pivoting axis with a first trigger free end of the first trigger member extending towards the second end, the first trigger member at least partially surrounding the front side of the handle closer to the first trigger free end than to the first pivoting axis, the second trigger member pivotally connected to the second pivoting axis with a second trigger free end of the second trigger member extending towards the first end, the second trigger member at least partially surrounding the front side of the handle closer to the second trigger free end than to the second pivoting axis, the first trigger free end positioned closer to the second trigger free end than to the first end, the second trigger free end positioned closer to the first trigger free end than to the second end, the first trigger member configured to communicate the inlet with one of the first outlet or the second outlet, the second trigger member configured to communicate the inlet with a different one of the first outlet or the second outlet.

10. The fluid spray apparatus of claim 9, wherein the first outlet and the second outlet are each configured to receive a variety of fluid spray nozzles.

11. The fluid spray apparatus of claim 9, wherein the first outlet includes a diffuse spray nozzle and the second outlet includes a solid stream nozzle.

12. The fluid spray apparatus of claim 9, wherein at least one of the first outlet and the second outlet includes an adjustable spray nozzle.

13. The fluid spray apparatus of claim 9, wherein the handle includes a pistol grip handle.

14. The fluid spray apparatus of claim 9, wherein the first and second outlets define an outlet direction and wherein each of the first trigger member and the second trigger member faces the outlet direction.

15. The fluid spray apparatus of claim 9, further comprising:
   guide channels including:
      a first guide channel configured to receive a portion of the first trigger member through actuation; and
      a second guide channel configured to receive a portion of the second trigger member through actuation.

16. The fluid spray apparatus of claim 9, wherein the first and second trigger free ends include curved free ends to prevent pinching a user's finger when one or both of the first trigger member and the second trigger member are actuated.

17. A fluid spray apparatus comprising:
an inlet;
a first outlet;
a second outlet;
a handle; and
an actuator block defined along a front surface of the handle, the actuator block comprising first and second actuators arranged in series between first and second opposing ends of the actuator block, the first actuator pivotally connected at the first end with a first actuator free end of the first actuator extending towards the second end, the second actuator pivotally connected at the second end with a second actuator free end of the second actuator extending towards the first end, the first actuator free end in contact with the second actuator free end, the first actuator configured to communicate the inlet with one of the first outlet or the second outlet, and the second actuator configured to communicate the inlet with a different one of the first outlet or the second outlet, wherein
the front surface of the handle is configured to internally engage the first actuator nearer to the first actuator free end than to the first end of the actuator block, the front surface of the handle is further configured to internally engage the second actuator nearer to the second actuator free end than to the second end of the actuator block.

* * * * *